United States Patent
Zhao et al.

(10) Patent No.: US 6,683,756 B1
(45) Date of Patent: Jan. 27, 2004

(54) ACTUATOR ASSEMBLY WITH ENHANCED BONDING SURFACE FOR BONDING A VOICE COIL TO A YOKE

(75) Inventors: Leon Zhao, Maple Grove, MN (US); David D. Koester, Chanhassen, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/427,229

(22) Filed: Oct. 26, 1999

Related U.S. Application Data

(60) Provisional application No. 60/137,748, filed on Jun. 4, 1999.

(51) Int. Cl.[7] ............................................. G11B 5/54
(52) U.S. Cl. ...................................................... 360/265.8
(58) Field of Search ........................... 360/264.7, 264.8, 360/265, 265.7, 265.8

(56) References Cited

U.S. PATENT DOCUMENTS

| | | | |
|---|---|---|---|
| 3,793,128 A | 2/1974 | Chancellor, Jr. ............. 161/44 |
| 4,700,250 A | 10/1987 | Kuriyama .................... 360/104 |
| 5,558,789 A | 9/1996 | Singh ......................... 219/121.69 |
| 5,623,759 A | 4/1997 | Thorson et al. ............. 29/603.24 |
| 5,656,877 A * | 8/1997 | Loubier ....................... 310/13 |
| 5,734,528 A * | 3/1998 | Jabbari et al. .............. 360/106 |
| 5,759,418 A | 6/1998 | Frater et al. ................. 216/22 |
| 5,808,835 A | 9/1998 | Fujiwara ..................... 360/104 |
| 5,808,836 A | 9/1998 | Frater et al. ................ 360/104 |
| 5,896,646 A | 4/1999 | Boutaghou et al. ....... 29/603.01 |
| 5,910,338 A | 6/1999 | Donde ........................ 427/290 |
| 5,930,071 A * | 7/1999 | Back ........................... 360/97.01 |
| 6,014,286 A * | 1/2000 | Tsutaki et al. ............... 360/84 |
| 6,061,206 A * | 5/2000 | Foisy et al. ................. 360/105 |
| 6,169,224 B1 * | 1/2001 | Heinecke et al. .......... 602/58 |
| 6,226,157 B1 * | 5/2001 | Kim .......................... 360/266.1 |

* cited by examiner

*Primary Examiner*—Jefferson Evans
(74) *Attorney, Agent, or Firm*—Derek J. Berger

(57) ABSTRACT

An information handling system including a base, a disc rotatably attached to the base; and an actuator assembly movably attached to the base. The actuator assembly also has a main body which includes a pivoting portion, an actuator arm attached to the main body, and a yoke attached to the main body. The yoke has a roughened bonding surface. A voice coil bonded to the yoke. The bonding surface has a plurality of grooves therein. The grooves or any roughening results in a plurality of features on the bonding surface of the yoke which increases the area of the bonding surface for bonding the voice coil to the yoke of the actuator assembly. The plurality of features in the bonding surface are designed to minimize cracks or potential cracking in the yoke of the actuator assembly.

11 Claims, 5 Drawing Sheets

ACTUATOR ASSEMBLY WITH ENHANCED BONDING SURFACE FOR BONDING A VOICE COIL TO A YOKE

RELATED APPLICATION

This application claims the benefit of U.S. Provisional Application Serial No. 60/137,748, filed Jun. 4, 1999 under 35 U.S.C. 119(e).

FIELD OF THE INVENTION

The present invention relates to the field of mass storage devices. More particularly, this invention relates to an actuator of a disc drive.

BACKGROUND OF THE INVENTION

One key component of any computer system is a device to store data. Computer systems have many different places where data can be stored. One common place for storing massive amounts of data in a computer system is on a disc drive. The most basic parts of a disc drive are a disc that is rotated, an actuator that moves a transducer to various locations over the disc, and electrical circuitry that is used to write and read data to and from the disc. The disc drive also includes circuitry for encoding data so that it can be successfully retrieved and written to the disc surface. A microprocessor controls most of the operations of the disc drive as well as passing the data back to the requesting computer and taking data from a requesting computer for storing to the disc.

The transducer is typically placed on a small ceramic block, also referred to as a slider, that is aerodynamically designed so that it flies over the disc. The slider is passed over the disc in a transducing relationship with the disc. Most sliders have an air-bearing surface ("ABS") which includes rails and a cavity between the rails. When the disc rotates, air is dragged between the rails and the disc surface causing pressure, which forces the head away from the disc. At the same time, the air rushing past the cavity or depression in the air bearing surface produces a negative pressure area. The negative pressure or suction counteracts the pressure produced at the rails. The slider is also attached to a load spring which produces a force on the slider directed toward the disc surface. The various forces equilibrate so the slider flies over the surface of the disc at a particular desired fly height. The fly height is the distance between the disc surface and the transducing head, which is typically the thickness of the air lubrication film. This film eliminates the friction and resulting wear that would occur if the transducing head and disc were in mechanical contact during disc rotation. In some disc drives, the slider passes through a layer of lubricant rather than flying over the surface of the disc.

Information representative of data is stored on the surface of the storage disc. Disc drive systems read and write information stored on tracks on storage discs. Transducers, in the form of read/write heads attached to the sliders, located on both sides of the storage disc, read and write information on the storage discs when the transducers are accurately positioned over one of the designated tracks on the surface of the storage disc. The transducer is also said to be moved to a target track. As the storage disc spins and the read/write head is accurately positioned above a target track, the read/write head can store data onto a track by writing information representative of data onto the storage disc. Similarly, reading data on a storage disc is accomplished by positioning the read/write head above a target track and reading the stored material on the storage disc. To write on or read from different tracks, the read/write head is moved radially across the tracks to a selected target track. The data is divided or grouped together on the tracks. In some disc drives, the tracks are a multiplicity of concentric circular tracks. In other disc drives, a continuous spiral is one track on one side of a disc drive. Servo feedback information is used to accurately locate the transducer. The actuator assembly is moved to the required position and held very accurately during a read or write operation using the servo information.

An actuator is used to move the read/write head or transducer. A voice coil motor is used to move the actuator. In most disc drives, the coil of the voice coil motor is attached to the actuator assembly. In most disc drives, the coil is attached to a y-shaped yoke. The an adhesive is typically used to attach the voice coil to the yoke. As the form factors for disc drives have been reduced, the size of the actuator and the yoke has also gotten smaller. In addition, the actuators within a form factor have also been made smaller and lighter to reduce the moment of inertia associated with the actuator. As disc drives have become smaller and smaller, the bonding surfaces between the voice coil and the actuator yoke have decreased which in turn has reduced the overall strength of the bond. Inadequate bonding causes other problems which result in failure of the disc drive. The bonding surface associated with the yoke of the actuator assembly can crack or the voice coil can separate from the yoke. When the voice coil separates, the voice coil is inoperable and the transducer attached to the actuator assembly can not be moved from track to track. Particles are also generated when the voice coil is separated from the yoke or when the crack in the yoke forms.

What is needed is a disc drive which allows for a smaller, lighter yoke but which has a sufficient bond strength to prevent separation of the voice coil from the yoke. Also needed is a design which prevents cracks form developing during temperature variation in the disc drive.

SUMMARY OF THE INVENTION

An actuator assembly for a disc drive includes a main body. A pivoting portion is included in the main body. The actuator assembly also includes an actuator arm attached to the main body and a yoke attached to the main body. The yoke has a roughened bonding surface. A voice coil is bonded to the yoke. The roughened bonding surface on the yoke can be accomplished using several different structures. The bonding surface may have a plurality of grooves therein. The bonding surface may include a plurality of lands. The bonding surface may include a plurality of raised portions. The bonding surface may also be provided with a first set of grooves and a second set of grooves. The first set of grooves would be transverse to a second set of grooves. The bonding surface may also have an elongated groove therein. The elongated groove would traverse the width dimension of the yoke. The bonding surface basically includes a plurality of features for increasing the area of the bonding surface between the yoke and the voice coil. The plurality of features in the bonding surface are designed to minimize cracks in the yoke of the actuator assembly.

Also disclosed is a method for attaching a voice coil to the yoke of an actuator assembly a disc drive. The voice coil is part of a voice coil motor for moving the actuator assembly. The method includes roughening the bonding surface of the yoke, applying an adhesive to one of the voice coil or the bonding surface, and placing the voice coil into contact with the bonding surface of the yoke. Roughening the bonding surface of the yoke may include providing features in the bonding surface of the yoke that increase the surface area of the bonding surface. Roughening the bonding surface of the yoke also may include providing features in the bonding surface of the yoke that decrease cracking in the bonding surface of the yoke. Specifically, roughening the bonding surface of the yoke includes forming grooves in the bonding surface of the yoke. Both a first set of grooves and a second set of grooves can be formed in the bonding surface of the yoke. When formed, the first set of grooves is transverse to the second set of grooves.

A disc drive actuator assembly includes a main body. The actuator assembly also includes a transducer. The transducer is attached to the main body. A yoke is also attached to the main body. The yoke includes a feature or features for increasing the surface area. Advantageously, the disc drive with the yoke having increased surface area allows for a smaller, lighter yoke with a sufficient bond strength to prevent separation of the voice coil from the yoke. The yoke design also prevents cracks form developing during temperature variation in the disc drive. The yoke and the disc drive last longer since a failure mode has been removed. In addition, the disc drive is more dependable over its extended life.

DESCRIPTION OF THE PREFERRED EMBODIMENT

In the following detailed description of the preferred embodiments, reference is made to the accompanying drawings which form a part hereof, and in which are shown byway of illustration specific embodiments in which the invention may be practiced. It is to be understood that other embodiments may be utilized and structural changes may be made without departing from the scope of the present invention.

Figure 1:
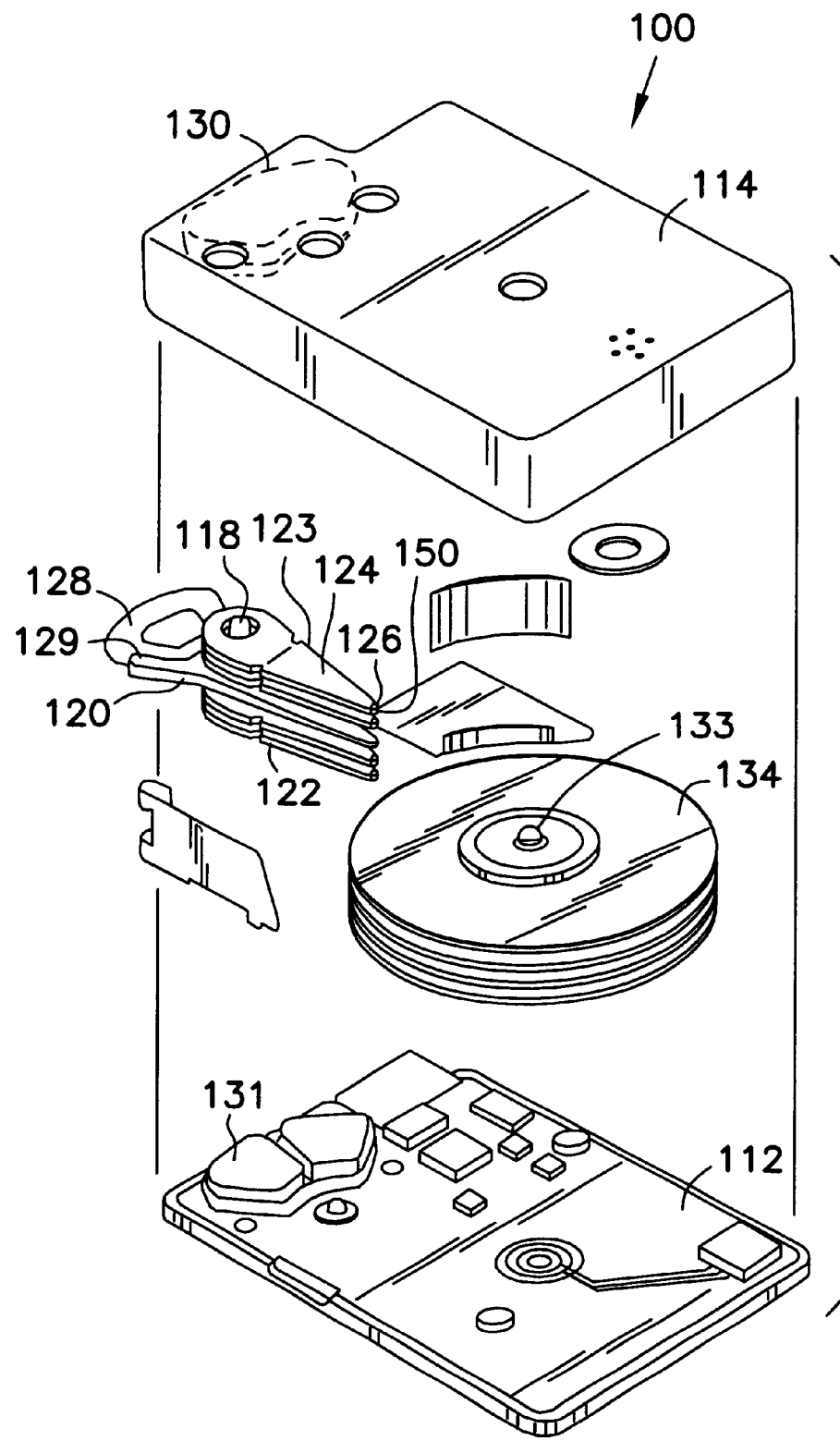
FIG. 1 is an exploded view of a disc drive with a multiple disc stack and actuator assembly with an attached voice coil motor.

The invention described in this application is useful with all mechanical configurations of disc drives having either rotary or linear actuation. In addition, the invention is also useful in all types of disc drives including hard disc drives, zip drives, floppy disc drives and any other type of drives where unloading the transducer from a surface and parking the transducer may be desirable. FIG. 1 is an exploded view of one type of a disc drive 100 having a rotary actuator. The disc drive 100 includes a housing or base 112, and a cover 114. The base 112 and cover 114 form a disc enclosure. Rotatably attached to the base 112 on an actuator shaft 118 is an actuator assembly 120. The actuator assembly 120 includes a comb-like structure 122 having a plurality of arms 123. Attached to the separate arms 123 on the comb 122, are load beams or load springs 124. Load beams or load springs are also referred to as suspensions. Attached at the end of each load spring 124 is a slider 126 which carries a magnetic transducer 150. The slider 126 with the transducer 150 form what is many times called the head. It should be noted that many sliders have one transducer 150 and that is what is shown in the figures. It should also be noted that this invention is equally applicable to sliders having more than one transducer, such as what is referred to as an MR or magneto resistive head in which one transducer 150 is generally used for reading and another is generally used for writing. On the end of the actuator arm assembly 120 opposite the load springs 124 and the sliders 126 is a y-shaped yoke 129 for holding a voice coil 128. The yoke 129 can be integrally formed with the actuator assembly or can be formed as a separate piece and assembled as shown in FIG. 1. The voice coil 128 is attached to the yoke 129 using an adhesive.

Attached within the base 112 is a first magnet 130 and a second magnet 131. As shown in FIG. 1, the second magnet 131 is associated with the cover 114. The first and second magnets 130, 131, and the voice coil 128 are the key components of a voice coil motor which applies a force to the actuator assembly 120 to rotate it about the actuator shaft 118. Also mounted to the base 112 is a spindle motor. The spindle motor includes a rotating portion called the spindle hub 133. In this particular disc drive, the spindle motor is within the hub. In FIG. 1, a number of discs 134 are attached to the spindle hub 133. In other disc drives a single disc or a different number of discs may be attached to the hub. The invention described herein is equally applicable to disc drives which have a plurality of discs as well as disc drives that have a single disc. The invention described herein is also equally applicable to disc drives with spindle motors which are within the hub 133 or under the hub.

Figure 2:
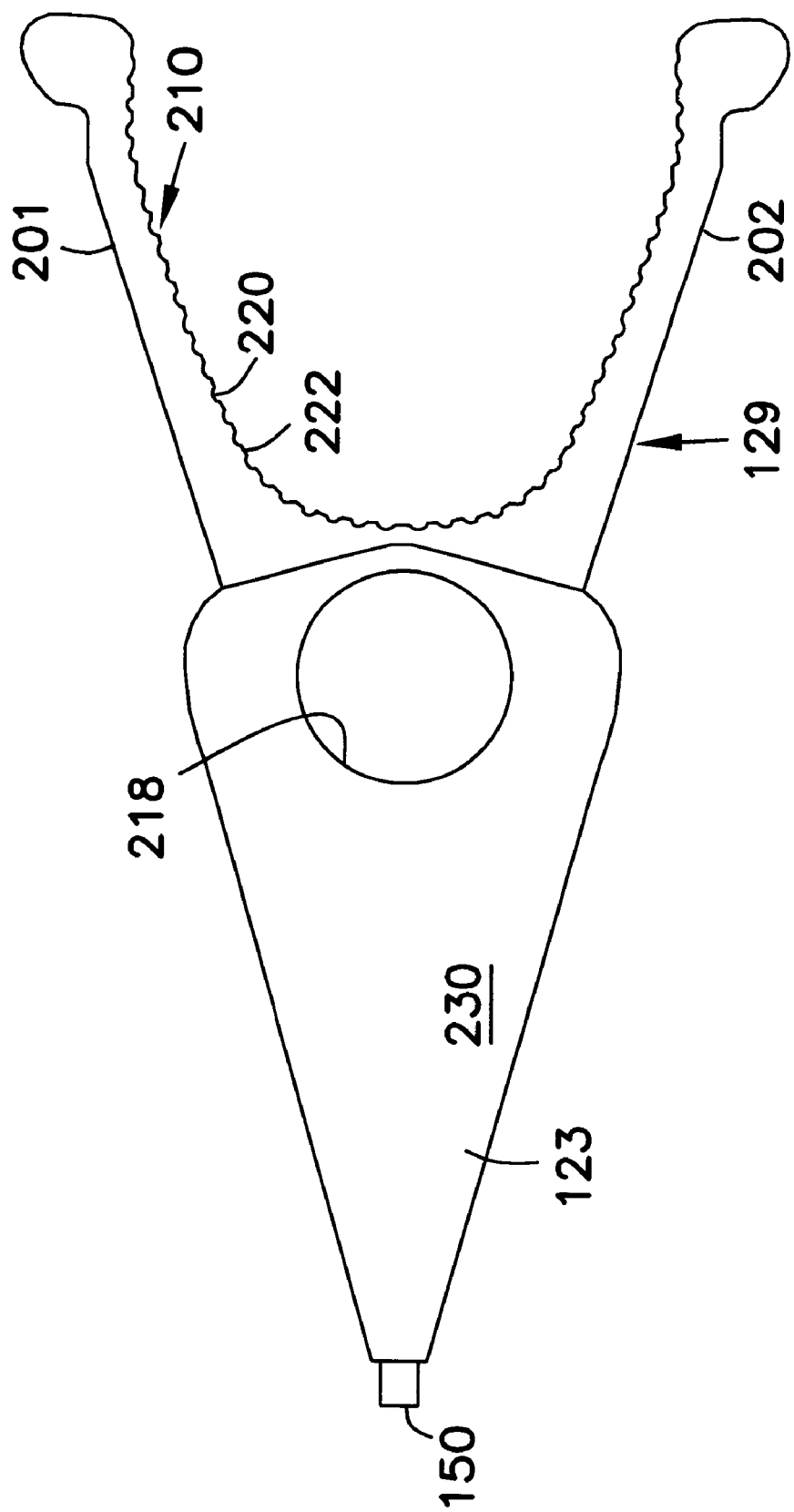
FIG. 2 is a top view of a yoke employing one embodiment of the invention.

FIG. 2 is a top view of an arm 123 having a yoke 129 employing one embodiment of the invention. The arm 123 includes an opening 218 therein. The opening 218 accommodates the actuator shaft 118 in an assembled actuator assembly 120. The yoke 129 includes a first leg 201 and a second leg 202. The yoke 129 includes a bonding surface 210. The bonding surface 210 is the surface to which the voice coil 128 bonds to the yoke 129. The bonding surface 210 extends from one end of the first leg of the yoke 129 to the end of the second leg 202 of the yoke 129. The bonding surface 210 includes a series or plurality of grooves 220. The yoke 129 actually has a thickness. The grooves 220 extend along the entire length of the thickness of the yoke 129. The grooves are closely spaced to one another. Between the grooves is a raised surface portion 222. The raised portion and the grooves 220 can be thought of as features in the bonding surface 210. The effect of providing features in the bonding surface 210 is to increase the surface area for the adhesive to act on for bonding the voice coil 128 to the bonding surface 210 of the yoke 129. The effect of having a larger surface is that a higher bonding strength is achieved between the voice coil and the yoke 129.

The arm 123 includes a planar surface 230. The grooves 220 are perpendicular to the arm planar surface and are positioned all the way around the arm yoke 129. The grooves are equally spaced and extend across the entire width of the arm 123, or more specifically, across the entire width of the yoke 129. The vertical grooves 220 increase the bonding surface by approximately 36%. Each groove holds a bit of adhesive and enhances the ability to prevent cracking in the bonding surface caused by thermal shear stress. The thermal shear stress is reduced because part of the shear stress is transferred to compressive stress due to the presence of the grooves. This particular design also inhibits cracks from being formed in the yoke 129, as well as providing for significant improvement in the bonding strength between the voice coil 128 and the bonding surface 210 of the yoke 129. The design inhibits cracking because of the interlock mechanism provided by the grooves on the bonding surface.

Figure 3:
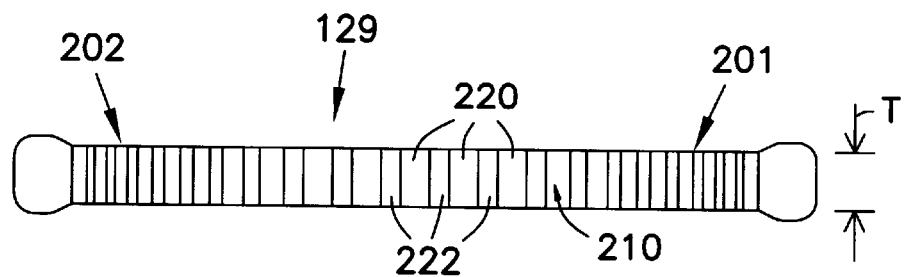
FIG. 3 is an end view of an arm having a yoke employing one embodiment of the invention.

FIG. 3 is an end view of the yoke 129 employing the embodiment of the invention shown in FIG. 2. As can be seen from FIG. 3 the yoke 129 has a width or thickness T. The grooves 220 extend across the width T of the yoke 129. The grooves 220 are also equally spaced, and produce a raised portion or a raised feature 222 between each of the grooves 220.

Figure 4:
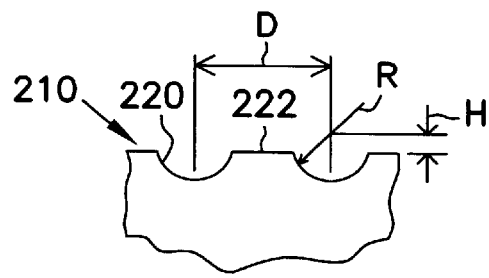
FIG. 4 is a close up portion of the yoke detailing the grooves shown in FIGS. 2 and 3.

FIG. 4 is a closeup of a portion of the yoke detailing the grooves shown in FIGS. 2 and 3. The grooves 220 are made on a radius R. The center point for the arc which forms the groove 220 is above the bonding surface 210 by a distance H. In other words, the depth of the groove 220 will equal R minus H. The grooves are at a uniform distance apart from one another, as depicted by the distance D dimensions shown in FIG. 4. In the preferred embodiment the distance D is approximately equal to 0.05", the radius R equals 0.016" and the height dimension H is equal to 0.006". Of course, it should be noted that different dimensions can be used for R, D and H to achieve similar results.

Figure 5:
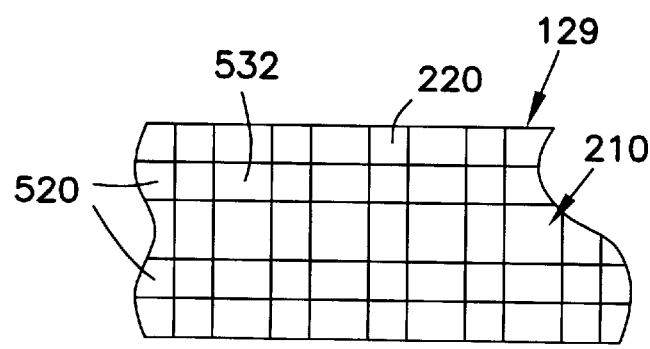
FIG. 5 is a close up of the bonding surface of another embodiment of the invention.

FIG. 5 is a closeup of the bonding surface 210 of another embodiment of the invention. The invention is not limited to merely having grooves 220 which extend across the width T of the yoke 129. As shown in FIG. 5, the bonding surface includes grooves 220. In addition to the grooves 220, the bonding surface is provided with grooves 520 which traverse the grooves 220. The grooves 220 and the grooves 520 result in raised portions 532 which are bounded by grooves 520 or end surface as well as grooves 220. Again, the grooves 520 and the grooves 220 produce an increased bonding surface area 210 which enhances the strength of the bond between the voice coil 128 and the yoke 129 of the actuator assembly 120.

Figure 6:
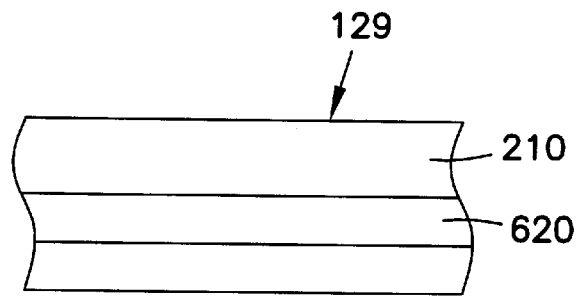
FIG. 6 is a close up of the bonding surface of yet another embodiment of the invention.

FIG. 6 shows another closeup of the bonding surface of yet another embodiment of the invention. The bonding surface 210 includes a single groove 620 which is substantially parallel to the top and bottom surface of the yoke 129. Again, the groove 620 provides additional bonding surface area to enhance the strength of the bond between the coil 128 and the yoke 129.

Figure 7:
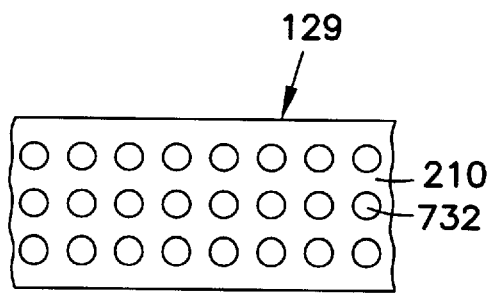
FIG. 7 is a close up of the bonding surface of yet another embodiment of the invention.

FIG. 7 shows yet another closeup of the bonding surface 210 of yet another embodiment of this invention. In this particular embodiment the bonding surface is comprised of raised lands 732 positioned throughout the bonding surface 210 on the yoke 129. The land 732 can be formed by any number of means. For example, photolithography could be used to produce circular or lands 732 of any particular geometric shape. In addition, the bonding surface 210 could be subjected to laser pulses to produce a series of raised portions or lands 732 on the bonding surface 210. The lands 732 shown in FIG. 7 are somewhat uniform, however, the lands 732 could be randomly spaced throughout the bonding surface 210. The lands could also be very small in comparison to the width of the yoke 129. The use of lands on the bonding surface increases the surface area of the bonding surface which in turn enhances the bond between the voice coil 128 and the yoke 129. The advantage of this particular embodiment is that the bonding surface 210 need not be machined and therefore particle generation would be minimized.

Figure 8:
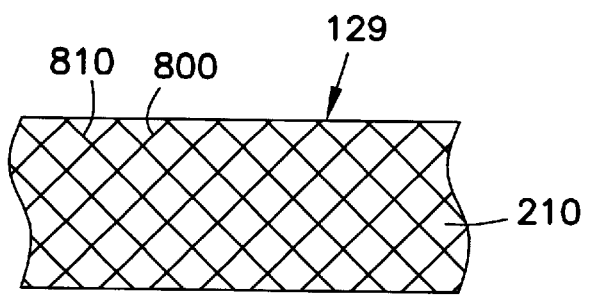
FIG. 8 is a close up of the bonding surface of yet another embodiment of the invention.

FIG. 8 shows a yet another closeup of the bonding surface 210 of yet another embodiment of this invention. In this particular embodiment, a series of small grooves or scratches have been formed. The scratches 800 extend across the entire width T of the yoke 129. The scratches 800 can be produced by a grinding or lapping machine. As shown in FIG. 8, scratches 800 occur in one direction, and scratches 810 occur in a second direction. The scratches 800 are transverse to the scratches 810 in the bonding surface 210 of the yoke 129. The overall effect of including the scratches 800 and 810 is that the area of the bonding surface 210 is increased. Increasing the area of bonding surface enhances the strength of the bond between the voice coil 128 and the yoke 129.

Figure 9:
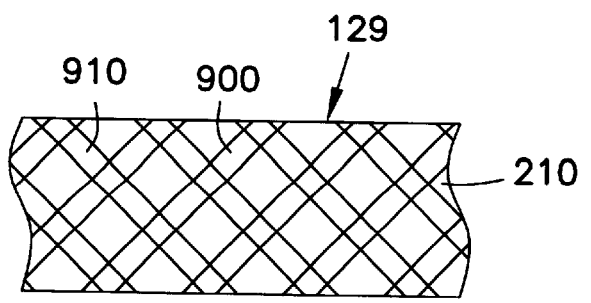
FIG. 9 is a close up of the bonding surface of yet another embodiment of the invention.

FIG. 9 shows yet another closeup of the bonding surface 210 for yet another embodiment of this invention. In this particular embodiment, grooves 900 are formed in one direction, and grooves 910 are formed in another direction across the width T of the yoke 129. The angle at which the first grooves 900 are transversed to the second grooves 910 can be varied and still be within the scope of the invention. The end result is that the grooves 900 and the grooves 910 produce features and also increase the surface area of the bonding surface 210. By increasing the area of the bonding surface 210, the strength of the bond is enhanced. As can be seen, the invention is to produce features within the bonding surface 210 of the yoke 129 such that the surface area of the bonding surface is increased. The particular features or grooves formed are limitless. The result of increasing the surface area is to increase the strength of the bond between the voice coil 128 and the actuator 129. In operation, the bonding surface 210 is roughened by providing any type of feature to the bonding surface 210 of the yoke 129. An adhesive is applied to one of the voice coils 128 or the bonding surface 129, and the voice coil 128 is then placed into contact with the bonding surface 210 of the yoke 129. Most commonly, a heat-cured adhesive, such as 3M Scotch-Weld 2214, is used to bond the coil 128 to the bonding surface 210 of the yoke 129. After the voice coil is placed into contact with the bonding surface 210 of the yoke 129 the assembly is placed in an oven for a certain amount of time in order to set the adhesive. If a different type of adhesive is used, the voice coil 128 must be held in contact to the bonding surface until the adhesive sets.

Advantageously, the disc drive with the yoke having increased surface area allows for a smaller, lighter yoke with a sufficient bond strength to prevent separation of the voice coil from the yoke. The yoke design also prevents cracks form developing during temperature variation in the disc drive. The yoke and the disc drive last longer since a failure mode has been removed. In addition, the disc drive is more dependable over its extended life.

Figure 10:
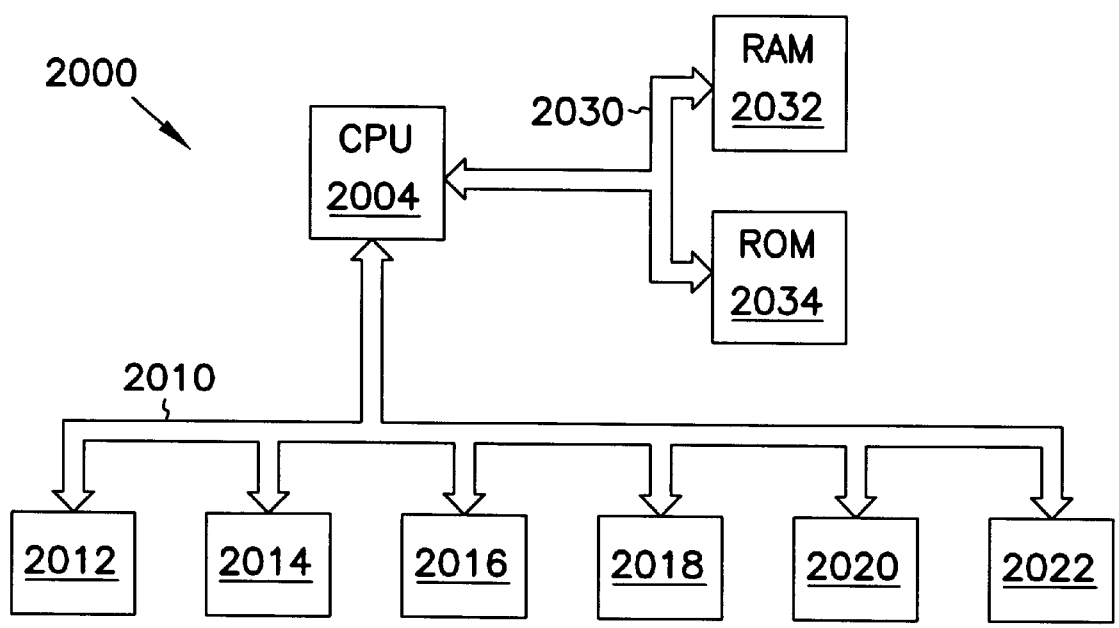
FIG. 10 is a schematic view of a computer system.

FIG. 10 is a schematic view of a computer system. Advantageously, the invention is well-suited for use in a computer system 2000. The computer system 2000 may also be called an electronic system or an information handling system and includes a central processing unit, a memory and a system bus. The information handling system includes a central processing unit 2004, a random access memory 2032, and a system bus 2030 for communicatively coupling the central processing unit 2004 and the random access memory 2032. The information handling system 2002 includes a disc drive device which includes the ramp described above. The information handling system 2002 may also include an input/output bus 2010 and several devices peripheral devices, such as 2012, 2014, 2016, 2018, 2020, and 2022 may be attached to the input output bus 2010. Peripheral devices may include hard disc drives, magneto optical drives, floppy disc drives, monitors, keyboards and other such peripherals. Any type of disc drive may use the method for loading or unloading the slider onto the disc surface as described above.

Conclusion

In conclusion, an actuator assembly 120 for a disc drive 100 includes a main body. A pivoting portion 118 is included in the main body. The actuator assembly also includes an actuator arm 124 attached to the main body and a yoke 129 attached to the main body. The yoke has a roughened bonding surface. A voice coil 128 is bonded to the yoke 129. The roughened bonding surface 210 on the yoke 129 can be accomplished using several different structures. The bonding surface may have a plurality of grooves 220 therein. The bonding surface 210 may include a plurality of lands 532. The bonding surface 210 may include a plurality of raised portions 732. The bonding surface may also be provided with a first set of grooves 800 and a second set of grooves 810. The first set of grooves 800 would be transverse to a second set of grooves 810. The bonding surface 210 may also have an elongated groove 620 therein. The elongated groove 620 would traverse the width dimension of the yoke 129. The bonding surface 210 basically includes a plurality of features for increasing the area of the bonding surface 210 between the yoke 129 and the voice coil 128. The plurality of features in the bonding surface are designed to minimize cracks in the yoke of the actuator assembly.

Also disclosed is an information handling system 2000 including a base 112, a disc 134 rotatably attached to the base 112; and an actuator assembly 120 movably attached to the base 112. The actuator assembly 120 also has a main body which includes a pivoting portion 118, an actuator arm 124 attached to the main body, and a yoke 129 attached to the main body. The yoke has a roughened bonding surface 210. A voice coil 128 bonded to the yoke. The bonding surface 210 has a plurality of grooves therein. The grooves increase the area of the bonding surface 210 for bonding the voice coil to the yoke. The bonding surface of the yoke may also be provided with a first set of grooves 900 and a second set of grooves 910. The first set of grooves 900 would be positioned transverse to a second set of grooves 910. Both the first set of grooves 900 and said second set of grooves 910 increase the area of the bonding surface 210 for bonding the voice coil 128 to the yoke 129 of the actuator assembly 120. The grooves or any roughening results in a plurality of features on the bonding surface 210 of the yoke 129 which increases the area of the bonding surface 210 for bonding the voice coil 128 to the yoke 129 of the actuator assembly 120. The plurality of features in the bonding surface 210 are designed to minimize cracks or potential cracking in the yoke 129 of the actuator assembly.

Also disclosed is a method for attaching a voice coil 128 to the yoke 129 of an actuator assembly 120 a disc drive 100. The voice coil 128 is part of a voice coil motor 128, 130, 131 for moving the actuator assembly 120. The method comprises the steps of roughening the bonding surface of the yoke, applying an adhesive to one of the voice coil 128 or the bonding surface 210, and placing the voice coil 128 into contact with the bonding surface 210 of the yoke 129. The step of roughening the bonding surface 210 of the yoke 129 may include providing features in the bonding surface 210 of the yoke 129 that increase the surface area of the bonding surface 210. The step of roughening the bonding surface 210 of the yoke 129 also may include providing features in the bonding surface 210 of the yoke 129 that decrease cracking in the bonding surface of the yoke. Specifically, the step of roughening the bonding surface of the yoke 129 includes forming grooves 800, 810, 900, 910 in the bonding surface of the yoke 129. Both a first set of grooves 800, 900 and a second set of grooves 810, 910 can be formed in the bonding surface 210 of the yoke 129. When formed, the first set of grooves 800, 900 is transverse to the second set of grooves 810, 910.

A disc drive actuator assembly 120 includes a main body. The actuator assembly also includes a transducer 150. The transducer is attached to the main body. A yoke 129 is also attached to the main body. The yoke includes a feature or features for increasing the surface area.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. An actuator assembly for a disc drive comprising:
  a main body which includes a pivoting portion;
  an actuator arm attached to the main body;
  a yoke attached to the main body, the yoke having a roughened bonding surface; and
  a voice coil bonded to the yoke, wherein the bonding surface has a first set of grooves therein which are transverse to a second set of grooves.

2. An actuator assembly for a disc drive comprising:
  a main body which includes a pivoting portion;
  an actuator arm attached to the main body;
  a yoke attached to the main body, the yoke having a roughened bonding surface; and
  a voice coil bonded to the yoke, wherein the bonding surface has an elongated groove therein, the groove traversing a width dimension of the yoke.

3. An information handling system comprising:
  a base;
  a disc rotatably attached to the base; and
  an actuator assembly movably attached to the base the actuator assembly further comprising:
    a main body which includes a pivoting portion;
    an actuator arm attached to the main body;
    a yoke attached to the main body, the yoke having a roughened bonding surface; and
    a voice coil bonded to the yoke, wherein the bonding surface has a first set of grooves therein which are transverse to a second set of grooves, said first set of grooves and said second set of grooves increasing the area of the bonding surface for bonding the voice coil to the yoke of the actuator assembly.

4. The information handling system of claim 3 wherein the bonding surface includes a plurality of features therein to provide increased area of the bonding surface for bonding the voice coil to the yoke of the actuator assembly.

5. The information handling system of claim 4 wherein the plurality of features in the bonding surface are designed to minimize cracks in the yoke of the actuator assembly.

6. A method for attaching a voice coil to the yoke of an actuator assembly a disc drive, the voice coil being part of a voice coil motor for moving the actuator assembly, the method comprising steps of:

(a) roughening the bonding surface of the yoke;

(b) applying an adhesive to one of the voice coil or the bonding surface; and (c) placing the voice coil into contact with the bonding surface of the yoke.

7. The method of claim 6 wherein step (a) includes (a)(I) providing features in the bonding surface of the yoke that increase the surface area of the bonding surface.

8. The method of claim 7 wherein step (a) includes (a)(I) providing features in the bonding surface of the yoke that decrease cracking in the bonding surface of the yoke.

9. The method of claim 7 wherein step (a)(I) includes forming grooves in the bonding surface of the yoke.

10. The method of claim 7 wherein step (a) includes (a)(I) providing features continuously along the bonding surface.

11. A method for attaching a voice coil to the yoke of an actuator assembly a disc drive, the voice coil being part of a voice coil motor for moving the actuator assembly, the method comprising steps of:

(a) roughening the bonding surface of the yoke which includes forming a first set of grooves in the bonding surface of the yoke and forming a second set of grooves in the bonding surface of the yoke, the first set of grooves transverse to the second set of grooves;

(b) applying an adhesive to one of the voice coil or the bonding surface; and (c) placing the voice coil into contact with the bonding surface of the yoke.

* * * * *